(12) United States Patent
Tan et al.

(10) Patent No.: US 9,782,833 B2
(45) Date of Patent: Oct. 10, 2017

(54) PNEUMATIC-TYPE PRECISION ANNULAR WORKPIECE INNER POSITIONING SURFACE CLAMPING DEVICE

(71) Applicant: HARBIN INSTITUTE OF TECHNOLOGY, Harbin, Heilongjiang (CN)

(72) Inventors: Jiubin Tan, Heilongjiang (CN); Yuanyuan Yang, Heilongjiang (CN); Lei Wang, Heilongjiang (CN); Bo Zhao, Heilongjiang (CN)

(73) Assignee: HARBIN INSTITUTE OF TECHNOLOGY, Harbin, Heilongjiang (CN)

( * ) Notice: Subject to any disclaimer, the term of this patent is extended or adjusted under 35 U.S.C. 154(b) by 0 days.

(21) Appl. No.: 15/111,145

(22) PCT Filed: Dec. 26, 2014

(86) PCT No.: PCT/CN2014/095119
§ 371 (c)(1),
(2) Date: Jul. 12, 2016

(87) PCT Pub. No.: WO2015/120747
PCT Pub. Date: Aug. 20, 2015

(65) Prior Publication Data
US 2016/0339528 A1 Nov. 24, 2016

(30) Foreign Application Priority Data

Feb. 14, 2014 (CN) .......................... 2014 1 0051849

(51) Int. Cl.
*B23B 31/40* (2006.01)
*B23B 31/20* (2006.01)
*B23Q 3/08* (2006.01)

(52) U.S. Cl.
CPC .......... *B23B 31/402* (2013.01); *B23B 31/204* (2013.01); *B23Q 3/08* (2013.01);
(Continued)

(58) Field of Classification Search
CPC ................. B23B 31/204; B23B 31/402; Y10T 279/1012; Y10T 279/1021; Y10T 279/1033; Y10T 279/1258
See application file for complete search history.

(56) References Cited

U.S. PATENT DOCUMENTS 2,393,458 A * 1/1946 Cook .................... B23B 31/208
279/156
3,216,733 A * 11/1965 Parker ................. B23B 31/4033
279/156
(Continued)

FOREIGN PATENT DOCUMENTS

CH 670780 A5 * 7/1989 ........... B32B 31/202
CN 201702404 1/2011
(Continued)

OTHER PUBLICATIONS

International Search Report of International Application No. PCT/CN2014/095119 dated Mar. 6, 2015.

*Primary Examiner* — Eric A Gates
(74) *Attorney, Agent, or Firm* — Ping Wang; Andrews Kurth Kenyon LLP

(57) ABSTRACT

A pneumatic-type precision annular workpiece inner positioning surface clamping device, wherein a rod portion of a piston assembly (5) is inserted into a central hole of the wedge-shaped block (12), and the piston portion of the piston assembly (5) is located in a closed chamber of a cylinder body (15); a disc spring (3) is sleeved on the piston assembly (5); an air intake hole (1-1) is provided in the lower plate (1), an air vent hole (15-1) is provided at the upper portion of the cylinder body (15); and an elastic hinge
(Continued)

block (6) is sleeved outside the wedge-shaped block (12). The pneumatic-type precision annular workpiece inner positioning surface clamping device has a simple structure, high reliability and strong adaptability.

10 Claims, 1 Drawing Sheet

(52) U.S. Cl.
CPC ..... *B23Q 2703/10* (2013.01); *Y10T 279/1012* (2015.01); *Y10T 279/1258* (2015.01)

(56) References Cited

U.S. PATENT DOCUMENTS

| | | | | |
|---|---|---|---|---|
| 3,776,562 | A * | 12/1973 | Gross | ............... B23B 31/40 279/145 |
| 4,208,061 | A * | 6/1980 | Morawski | ........... B23B 31/4033 242/573 |
| 4,840,387 | A | 6/1989 | McCarthy | |
| 5,397,135 | A * | 3/1995 | Smith | ................. B23B 31/4033 279/156 |
| 5,997,011 | A * | 12/1999 | Nordquist | ............ B23Q 1/0081 279/2.09 |
| 7,044,477 | B2 * | 5/2006 | Wu | ...................... B23B 31/204 279/137 |
| 7,971,883 | B2 * | 7/2011 | Soroka | ................. B23Q 1/0072 279/155 |
| 9,149,875 | B2 * | 10/2015 | Kramer | ............ B23B 31/16166 |

FOREIGN PATENT DOCUMENTS

| | | | | |
|---|---|---|---|---|
| CN | | 102437079 | 5/2012 | |
| CN | | 102717110 | 10/2012 | |
| CN | | 202804752 | 3/2013 | |
| CN | | 103786044 | 5/2014 | |
| DE | | 1777116 A1 * | 4/1971 | ....... B23B 31/16158 |
| EP | | 2025471 | 2/2009 | |

* cited by examiner

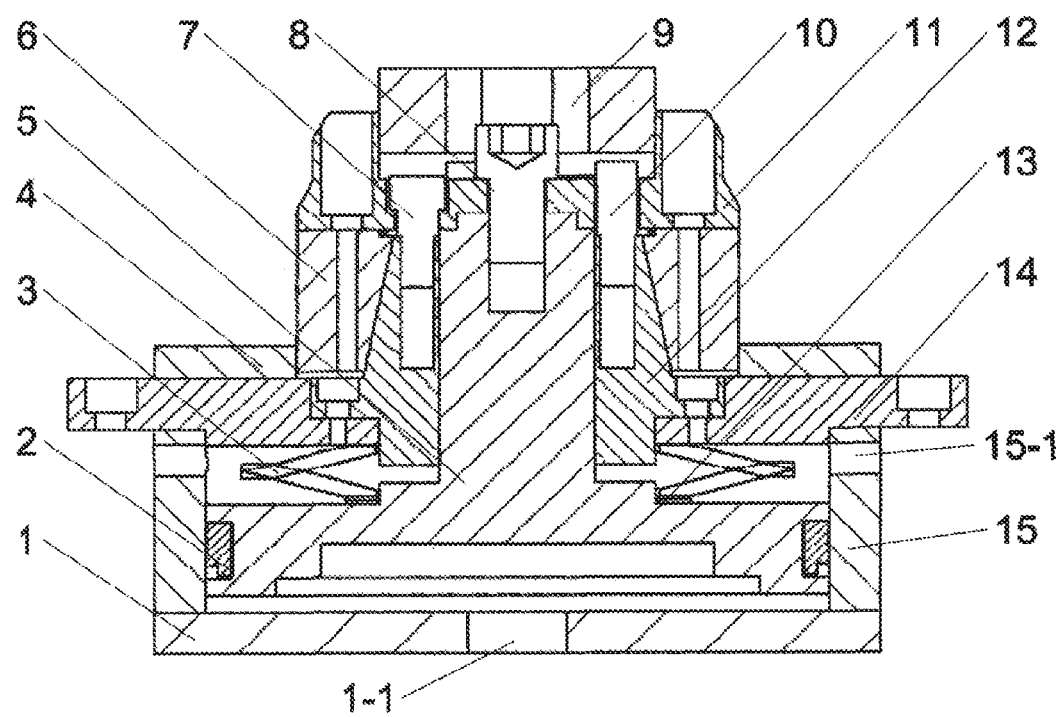

PNEUMATIC-TYPE PRECISION ANNULAR WORKPIECE INNER POSITIONING SURFACE CLAMPING DEVICE

TECHNICAL FIELD

The present invention belongs to a workholding apparatus, and mainly relates to a clamping device for a precision annular workpiece in the field of equipment manufacture.

BACKGROUND ART

In the fields of ultra-precision measurement and testing and ultra-precision machining, a clamping device with high speed, stability and precise positioning is the fundamental guarantee to precision measurement and aviation engine assembly. At present, with the progress in material science, as well as the increase in precision levels of ultra-precision measuring instruments and ultra-precision manufacturing equipment, designs of high-precision annular workpiece are applied more and more widely, and the devices used in the machining process becomes a basis for ensuring the machining precision.

Hefei University of Technology proposed a swing rod axial buckling chuck (Swing Rod Axial Buckling Chuck; Patent Application No.: CN 201210212982.1). The program is designed with a power chuck body and a clamping chuck body, wherein three chutes are uniformly distributed along a radial direction and are embedded with bottom claws and push claws, and a swing rod assembly is provided on the upper side. With such structure, the problem that a traditional chuck has difficulty in clamping a workpiece with a complicated structure is solved. Yet, this program still has a drawback that its use of axial clamping is not suitable for clamping thin-walled cylindrical workpieces.

BEIJING SEVENSTAR HUACHANG ELECTRONICS CO., LTD. proposed a disk clamping device (Disk Clamping Device, Patent Application No.: CN 201110365937.5). The program mainly includes a chuck main body, a cam, a stop block and at least three clamping members, wherein the stop block fixes the clamping member in the radial direction of the chuck main body when the cam rotates along with the chuck main body. Such structure is characterized in that the clamping position of the mechanical hand is not limited and clamping of a disk is realized without damaging the clamped object. Yet, the problem of the program lies in that it uses an outside chuck and the clamping member may cause deformation of the contour outline of the clamped object, which cannot be ignored for ultra-precision parts.

U.S. Pat. No. 4,840,387 proposed a clamping device in which the split nuts and chuck are mutually fitted and locked. Such structure is characterized in that it has high reliability and tightening of the chuck can be easily adjusted by hand, but the problem lies in that its structure is a little bit complex, so it is necessary to correspondingly enlarge the device in proportion when clamping large workpieces, resulting in increased friction during adjustment, which is not conducive to assembly and clamping.

Generally, the traditional three-jaw chuck and multi-jaw chuck clamping mechanisms may cause irreparable damages to the surface of the workpiece during assembly due to their own natural defects of applying uneven forces to the workpiece. In addition, with the constant emerge of more and more large and ultra-large annular workpieces, volume of the traditional three-jaw chuck and multi-jaw chuck clamping mechanisms should be enlarged as the outer diameter of the circular ring increases, which provides them less advantage in terms of economic cost and limits the designers in designing large annular workpieces at the same time.

Therefore, to design a clamping device which can overcome the drawbacks of the traditional chuck structure and also has the advantages of high stability, precise positioning, less damage to the workpiece surface is important for the manufacture of precision equipment.

SUMMARY OF THE INVENTION

With respect to the above problems of the prior art and referring to the practical needs, an object of the present invention is to provide a pneumatic-type precision annular workpiece inner positioning surface clamping device which can improve the processing quality of the precision annular workpiece, has strong adaptability and is easy for use.

Aspects of the present invention are as follows.

A pneumatic-type precision annular workpiece inner positioning surface clamping device is formed in such a manner that: an upper plate and a lower plate are tightly fixed onto the upper and lower end surfaces of a cylinder body, respectively; a wedge-shaped block is fixed on the upper plate, forming a closed chamber in the cylinder body; a rod portion of a piston assembly is inserted into a central hole of the wedge-shaped block, and the piston portion of the piston assembly is provided in the closed chamber formed in the cylinder body, dividing the closed chamber into an upper chamber and a lower chamber which are completely separated from each other; a seal ring is provided on the outer circular surface of the piston portion of the piston assembly; a disc spring (belleville spring) is sleeved on the piston assembly and is located in the upper chamber of the cylinder body; the upper end surface of the disc spring is fitted to contact with the lower end surface of the upper plate, and the lower end surface of the disc spring is fitted to contact with the piston portion of the piston assembly through the washer; an air intake hole communicating with the lower chamber of the cylinder body is provided in the lower plate, and an air vent hole communicating with the upper chamber of the cylinder body is provided at the upper portion of the cylinder body; an elastic hinge block which is capable of contracting or expanding along a radial direction is sleeved outside the upper side of the wedge-shaped block; a limited ring is nested outside the elastic hinge block; an adapter plate is fixed to the upper end of the rod portion of the piston assembly through pretightening screws, and is firmly connected with the elastic hinge block; an adjustment knob is provided on the adapter plate through screw threads; limited screws and a limited pillar are inserted into the adapter plate and are in threaded connection with the wedge-shaped block.

The Technical innovation and advantageous effects of the present invention are as follows:

It uses air as the medium to realize centralized gas supply by utilizing the compressibility of the air, thereby significantly simplifying mechanical design and maintenance; application of force is uniform, so non-linear effects caused by uneven force is reduced; intelligent control of operating speed can be achieved, and the input and output torques and the operating speed can be easily adjusted; the device has a simple structure, light weight, low manufacturing cost, high reliability and long service life, is easy in installation and maintenance, and can realize buffering.

BRIEF DESCRIPTION OF THE DRAWING

The drawing shows a schematic view of the overall structure of the pneumatic-type precision annular workpiece inner positioning surface clamping device.

Part numbers in the drawing: 1—a lower plate; 1-1—an air intake hole; 2—a seal ring.; 3—a disc spring; 4—a limited ring; 5—a piston assembly; 6—an elastic hinge block; 7—limited screws; 8—a pretightening screw; 9—an adjustment knob; 10—a limited pillar; 11—an adapter plate; 12—a wedge-shaped block; 13—a washer; 14—an upper plate; 15—a cylinder body; 15-1—an air vent hole.

DETAILED DESCRIPTION OF THE INVENTION

Specific embodiments of the present invention are further described in detail with reference to the drawing.

A pneumatic-type precision annular workpiece inner positioning surface clamping device, characterized in that, an upper plate 14 and a lower plate 1 are tightly fixed onto the upper and lower end surfaces of a cylinder body 15, respectively; a wedge-shaped block 12 is fixed on the upper plate 14, forming a closed chamber in the cylinder body 15; a rod portion of a piston assembly 5 is inserted into a central hole of the wedge-shaped block 12, and the piston portion of the piston assembly 5 is provided in a closed chamber formed in the cylinder body 15, dividing the closed chamber into an upper chamber and a lower chamber which are completely separated from each other; a seal ring 2 is provided on the outer circular surface of the piston portion of the piston assembly 5; a disc spring 3 is sleeved on the piston assembly 5 and is located in the upper chamber of the cylinder body 15; the upper end surface of the disc spring 3 is fitted to contact with the lower end surface of the upper plate 14, and the lower end surface of the disc spring 3 is fitted to contact with the piston portion of the piston assembly 5 through a washer 13; an air intake hole 1-1 communicating with the lower chamber of the cylinder body 15 is provided in the lower plate 1, and an air vent hole 15-1 communicating with the upper chamber of the cylinder body 15 is provided at the upper portion of the cylinder body 15; an elastic hinge block 6 which is capable of contracting or expanding along a radial direction is sleeved outside the upper side of the wedge-shaped block 12; a limited ring 4 is nested outside the elastic hinge block 6; an adapter plate 11 is fixed to the upper end of the rod portion of the piston assembly 5 through pretightening screws 8, and is firmly connected with the elastic hinge block 6; an adjustment knob 9 is provided on the adapter plate 11 through threaded fit; limited screws 7 and a limited pillar 10 are inserted into the adapter plate 11 and are in threaded connection with the wedge-shaped block 12.

During operation, compressed air is introduced into the lower chamber of the cylinder body 15 through the air intake hole 1-1; the piston assembly 5 compresses the disc spring 3 and pushes the piston assembly 5 to work, driving the adapter plate 11 and the elastic hinge block 6 to move upward; at the same time, air in the upper chamber of the cylinder body 15 is discharged from the air vent hole 15-1, causing disengagement of the elastic hinge block 6 and the wedge-shaped block 12; the elastic hinge block 6 retracts, and the outer ring and the annular workpiece depart from each other, realizing the separation of the device from the workpiece; after the compressed air is removed, the elastic force of the disc spring 3 acts outward to push the piston assembly 5 to move downward, thereby enabling the elastic hinge block 6 and the wedge-shaped block 12 to be pressed again; then the radial component force on the contact surface promotes the elastic hinge block 6 to expand outward, and the outer ring and the annular workpiece are again pressed against each other, achieving chucking between the device and the workpiece.

In the pneumatic-type precision annular workpiece inner positioning surface clamping device, the limited screw 7 is used for limiting the upward stroke of the piston assembly 5 and in turn restricting the contraction degree of the elastic hinge block 6; the adjustment knob 9 and the stopper pillar 10 can be coordinately adjusted to contact with each other by presetting the height of the stopper pillar 10 and rotating the adjustment knob 9, so that the outward expansion of the elastic hinge blocks 6 can be precisely defined; when the outward expansion of the elastic hinge block 6 is not precisely defined, the limited ring 4 may act for complementary limitation.

The invention claimed is:

1. A pneumatic-type precision annular workpiece inner positioning surface clamping device, characterized in that, an upper plate (14) and a lower plate (1) are fixed onto the upper and lower end surfaces of a cylinder body (15), respectively; a wedge-shaped block (12) is fixed on the upper plate (14), forming a closed chamber in the cylinder body (15); a rod portion of a piston assembly (5) is inserted into a central hole of the wedge-shaped block (12), and the piston portion of the piston assembly (5) is provided in the closed chamber formed in the cylinder body (15), dividing the closed chamber into an upper chamber and a lower chamber which are completely separated from each other; a seal ring (2) is provided on the outer circular surface of the piston portion of the piston assembly (5); a disc spring (3) is sleeved on the piston assembly (5) and is located in the upper chamber of the cylinder body (15); the upper end surface of the disc spring (3) is fitted to contact with the lower end surface of the upper plate (14), and the lower end surface of the disc spring (3) is fitted to contact with the piston portion of the piston assembly (5) through a washer (13); an air intake hole (1-1) communicating with the lower chamber of the cylinder body (15) is provided in the lower plate (1), and an air vent hole (15-1) communicating with the upper chamber of the cylinder body (15) is provided at the upper portion of the cylinder body (15); an elastic hinge block (6) which is capable of contracting or expanding along a radial direction is sleeved outside the upper side of the wedge-shaped block (12); a limited ring (4) is nested outside the elastic hinge block (6); an adapter plate (11) is fixed to the upper end of the rod portion of the piston assembly (5) through pretightening screws (8), and is connected with the elastic hinge block (6); an adjustment knob (9) is provided on the adapter plate (11) through threaded fitting; limited screws (7) and a limited pillar (10) are inserted into the adapter plate (11) and are in threaded connection with the wedge-shaped block (12).

2. A pneumatic-type precision annular workpiece inner positioning surface clamping device, characterized in that, an upper plate (14) and a lower plate (1) are fixed onto the upper and lower end surfaces of a cylinder body (15), respectively; a block (12) is fixed on the upper plate (14), forming a closed chamber in the cylinder body (15); a rod portion of a piston assembly (5) is inserted into a central hole of the block (12), and the piston portion of the piston assembly (5) is provided in the closed chamber formed in the body (15), dividing the closed chamber into an upper chamber and a lower chamber which are separated from each other; a seal ring (2) is provided on the outer circular surface of the piston portion of the piston assembly (5); a spring (3) is sleeved on the piston assembly (5) and is located in the upper chamber of the body (15); the upper end surface of the spring (3) is fitted to contact with the lower end surface of the upper plate (14), and the lower end surface of the spring (3) is fitted to contact with the piston portion of the piston assembly (5) through a washer (13); an air intake hole (1-1) communicating with the lower chamber of the body (15) is provided in the lower plate (1), and an air vent hole (15-1) communicating with the upper chamber of the body (15) is provided at the upper portion of the body (15); a hinge block (6) which is sleeved outside the upper side of the block (12); an adapter plate (11) is fixed to the upper end of the rod portion of the piston assembly (5); an adjustment knob (9) is provided on the adapter plate (11); limited screws (7) and a limited pillar (10) are inserted into the adapter plate (11) and are in connection with the block (12).

3. The pneumatic-type precision annular workpiece inner positioning surface clamping device of claim 2, wherein the body (15) is a cylinder-shaped body.

4. The pneumatic-type precision annular workpiece inner positioning surface clamping device of claim 2, wherein the block (12) is a wedge-shaped block.

5. The pneumatic-type precision annular workpiece inner positioning surface clamping device of claim 2, wherein the spring (3) is a disc spring.

6. The pneumatic-type precision annular workpiece inner positioning surface clamping device of claim 2, wherein the hinge block (6) is an elastic hinge block that is capable of contracting or expanding along a radial direction.

7. The pneumatic-type precision annular workpiece inner positioning surface clamping device of claim 2, wherein the adapter plate (11) is fixed to the upper end of the rod portion of the piston assembly (5) through pretightening screws (8) and is connected with the hinge block (6).

8. The pneumatic-type precision annular workpiece inner positioning surface clamping device of claim 2, wherein the adjustment knob (9) is provided on the adapter plate (11) through threaded fitting.

9. The pneumatic-type precision annular workpiece inner positioning surface clamping device of claim 2, wherein the limited screws (7) and the limited pillar (10) are in threaded connection with the block (12).

10. The pneumatic-type precision annular workpiece inner positioning surface clamping device of claim 2, further comprising a limited ring (4) nested outside the hinge block (6).

* * * * *